(12) United States Patent
Ahn et al.

(10) Patent No.: US 11,553,157 B2
(45) Date of Patent: *Jan. 10, 2023

(54) DEVICE AND METHOD OF DISPLAYING IMAGES

(71) Applicant: Hyperconnect Inc., Seoul (KR)

(72) Inventors: Sangil Ahn, Cheongju-si (KR); Kangsik Jung, Seoul (KR); Hyountaek Yong, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,006

(22) Filed: Mar. 15, 2021

(65) Prior Publication Data

US 2021/0203882 A1 Jul. 1, 2021

Related U.S. Application Data

(63) Continuation-in-part of application No. 15/729,520, filed on Oct. 10, 2017.

(51) Int. Cl.
*H04N 7/14* (2006.01)
*G06T 5/50* (2006.01)
(Continued)

(52) U.S. Cl.
CPC ............ *H04N 7/147* (2013.01); *G06T 5/004* (2013.01); *G06T 5/50* (2013.01); *G06V 40/10* (2022.01);
(Continued)

(58) Field of Classification Search
USPC ....................................................... 348/14.07
See application file for complete search history.

(56) References Cited

U.S. PATENT DOCUMENTS

| 6,590,601 B2 | 7/2003 | Sukeno et al. |
| 7,321,384 B1 | 1/2008 | Wu et al. |
(Continued)

FOREIGN PATENT DOCUMENTS

| EP | 2515526 A2 | 10/2012 |
| EP | 2782326 A2 | 9/2014 |
(Continued)

OTHER PUBLICATIONS

Extended European Search Report dated Sep. 24, 2019 in European Application No. 17859740.7, in 11 pages.
(Continued)

*Primary Examiner* — Amal S Zenati
(74) *Attorney, Agent, or Firm* — KPPB LLP

(57) ABSTRACT

This application relates to an image display device and method. In one aspect, the image display device includes a communication interface, a user interface, a memory and a processor. The processor may receive, from a first terminal through the communication interface, a stream including a plurality of images captured by the first terminal. The processor may also determine whether the received stream includes a first image in which no face is detected among the plurality of images. The processor may further, in response to determining that the received stream includes the first image, perform image processing on the first image to generate a second image. The processor may further display, through the user interface, the plurality of images by replacing the first image with the second image.

17 Claims, 15 Drawing Sheets

(51) Int. Cl.
  *G06T 5/00* (2006.01)
  *G06V 40/10* (2022.01)
  *G06V 40/16* (2022.01)
(52) U.S. Cl.
  CPC ........... *G06V 40/161* (2022.01); *H04N 7/144* (2013.01); *G06T 2207/30201* (2013.01)

(56) References Cited

U.S. PATENT DOCUMENTS

| | | | |
|---|---|---|---|
| 7,564,476 B1* | 7/2009 | Coughlan | H04N 7/147 348/14.08 |
| 8,165,416 B2 | 4/2012 | Cutler | |
| 8,441,356 B1 | 5/2013 | Tedesco et al. | |
| 8,626,879 B2 | 1/2014 | Dham et al. | |
| 8,977,063 B2 | 3/2015 | Lee et al. | |
| 9,225,897 B1 | 12/2015 | Sehn | |
| 9,230,328 B1 | 1/2016 | Wotzlaw | |
| 9,282,287 B1 | 3/2016 | Marsh | |
| 9,319,632 B2 | 4/2016 | Kim et al. | |
| 9,380,264 B1 | 6/2016 | Vakalapudi | |
| 9,460,340 B2 | 10/2016 | Kauffmann et al. | |
| 9,503,456 B1 | 11/2016 | Lindberg et al. | |
| 9,569,697 B1 | 2/2017 | Mcnerney et al. | |
| 9,591,261 B2 | 3/2017 | Suzuki et al. | |
| 9,848,167 B1 | 12/2017 | Christian et al. | |
| 10,574,941 B2 | 2/2020 | Ahn et al. | |
| 10,791,261 B2 | 9/2020 | Oyman et al. | |
| 10,855,933 B2 | 12/2020 | Ahn et al. | |
| 10,965,907 B2 | 3/2021 | Ahn et al. | |
| 11,080,325 B2 | 8/2021 | Ahn et al. | |
| 11,102,450 B2 | 8/2021 | Ahn et al. | |
| 11,140,356 B2 | 10/2021 | Ahn et al. | |
| 11,184,582 B2 | 11/2021 | Ahn et al. | |
| 11,206,362 B2 | 12/2021 | Ahn | |
| 2003/0091239 A1 | 5/2003 | Imagawa et al. | |
| 2003/0126267 A1 | 7/2003 | Gutta et al. | |
| 2004/0049780 A1 | 3/2004 | Gee | |
| 2007/0195158 A1 | 8/2007 | Kies | |
| 2008/0012935 A1 | 1/2008 | Echtenkamp | |
| 2008/0259154 A1 | 10/2008 | Garrison et al. | |
| 2008/0298571 A1 | 12/2008 | Kurtz et al. | |
| 2009/0049467 A1 | 2/2009 | Robson et al. | |
| 2010/0017818 A1 | 1/2010 | Joshi et al. | |
| 2010/0054592 A1 | 3/2010 | Nanu et al. | |
| 2010/0124941 A1 | 5/2010 | Cho | |
| 2010/0226261 A1 | 9/2010 | Piché | |
| 2012/0155759 A1 | 6/2012 | Kang et al. | |
| 2012/0182379 A1 | 7/2012 | Ding | |
| 2012/0320141 A1 | 12/2012 | Bowen et al. | |
| 2013/0083155 A1 | 4/2013 | Andresen | |
| 2013/0147897 A1 | 6/2013 | Ichimura et al. | |
| 2013/0342633 A1 | 12/2013 | Ikeda et al. | |
| 2014/0176732 A1 | 6/2014 | Cohen et al. | |
| 2014/0267583 A1 | 9/2014 | Zhu et al. | |
| 2015/0030314 A1* | 1/2015 | Skarakis | G06V 40/23 386/278 |
| 2015/0070516 A1 | 3/2015 | Shoemake et al. | |
| 2015/0220777 A1* | 8/2015 | Kauffmann | G06V 40/10 382/103 |
| 2015/0229882 A1 | 8/2015 | Liu | |
| 2015/0286858 A1 | 10/2015 | Shaburov et al. | |
| 2015/0325023 A1 | 11/2015 | Gross | |
| 2015/0370474 A1 | 12/2015 | Belaunde et al. | |
| 2016/0019412 A1 | 1/2016 | Kang et al. | |
| 2016/0034786 A1 | 2/2016 | Suri et al. | |
| 2016/0127653 A1 | 5/2016 | Lee et al. | |
| 2016/0316265 A1 | 10/2016 | Gopalan et al. | |
| 2016/0350675 A1 | 12/2016 | Laks et al. | |
| 2016/0373571 A1 | 12/2016 | Woolsey et al. | |
| 2017/0251336 A1 | 8/2017 | Keller | |
| 2018/0027042 A1 | 1/2018 | Kim | |
| 2018/0103234 A1 | 4/2018 | Ahn et al. | |
| 2018/0176641 A1 | 6/2018 | Yun et al. | |
| 2018/0260577 A1 | 9/2018 | Adams et al. | |
| 2018/0309801 A1 | 10/2018 | Rathod | |
| 2018/0316892 A1 | 11/2018 | Jeong et al. | |
| 2019/0188453 A1 | 6/2019 | Ahn et al. | |
| 2019/0199963 A1 | 6/2019 | Ahn et al. | |
| 2019/0238759 A1 | 8/2019 | Ahn | |
| 2019/0251118 A1 | 8/2019 | Ahn et al. | |
| 2019/0266444 A1 | 8/2019 | Ryan, Jr. et al. | |
| 2019/0342246 A1 | 11/2019 | Theriault et al. | |
| 2020/0137352 A1 | 4/2020 | Ahn et al. | |
| 2020/0145613 A1 | 5/2020 | Ahn et al. | |
| 2020/0213530 A1 | 7/2020 | Ahn | |
| 2020/0242750 A1 | 7/2020 | Kokkula et al. | |
| 2020/0358904 A1 | 11/2020 | Ahn et al. | |
| 2021/0099672 A1 | 4/2021 | Ahn et al. | |
| 2021/0203880 A1 | 7/2021 | Ahn et al. | |
| 2021/0243407 A1 | 8/2021 | Ahn et al. | |
| 2021/0243408 A1 | 8/2021 | Ahn et al. | |
| 2022/0239862 A1 | 7/2022 | Ahn et al. | |

FOREIGN PATENT DOCUMENTS

| | | |
|---|---|---|
| EP | 3035283 A1 | 6/2016 |
| EP | 3800879 A1 | 4/2021 |
| JP | H09200714 A | 7/1997 |
| JP | 2001309325 A | 11/2001 |
| JP | 2003219383 A | 7/2003 |
| JP | 2006270380 A | 10/2006 |
| JP | 2012018571 A | 1/2012 |
| JP | 2012054897 A | 3/2012 |
| JP | 2017228224 A | 12/2017 |
| JP | 2019047357 A | 3/2019 |
| KR | 20010000426 A | 1/2001 |
| KR | 20040064972 A | 7/2004 |
| KR | 10-0844334 B1 | 7/2008 |
| KR | 100844334 B1 | 7/2008 |
| KR | 20080110064 A | 12/2008 |
| KR | 20110019499 A | 2/2011 |
| KR | 20110025720 A | 3/2011 |
| KR | 20110073238 A | 6/2011 |
| KR | 10-2012-0090870 A | 8/2012 |
| KR | 20120126677 A | 11/2012 |
| KR | 10-2014-0012474 A | 2/2014 |
| KR | 20150087362 A | 7/2015 |
| KR | 20180000255 A | 1/2018 |
| KR | 20180116520 A | 10/2018 |
| KR | 20190007934 A | 1/2019 |
| KR | 20190016671 A | 2/2019 |
| KR | 101989842 B1 | 6/2019 |
| WO | WO 2012/131932 A1 | 4/2012 |
| WO | 2014100774 A1 | 6/2014 |
| WO | 2015091487 A1 | 6/2015 |
| WO | 2015162647 A1 | 10/2015 |
| WO | 2016112299 A1 | 7/2016 |
| WO | 2018194243 A1 | 10/2018 |
| WO | 2018221824 A1 | 12/2018 |

OTHER PUBLICATIONS

Translation of Office Action dated Jun. 29, 2020 in Japanese Application No. 2019-540499, in 3 pages.
Office Action dated Nov. 30, 2018 in Korean Application No. 10-2018-0134869, in 5 pages.
Xing et al., "SafeVchat: Detecting Obscene Content and Misbehaving Users in Online Video Chat Services", World Wide Web, ACM, 2 Penn Plaza, Suite 701, New York, NY 10121-0701, Mar. 28, 2011, pp. 685-694.
Office Action dated Feb. 14, 2014 of Korean Patent Application No. 10-2016-0130656 which is the parent application—5 pages.
Office Action dated Aug. 29, 2017 of Korean Patent Application No. 10-2016-0130656 which is the parent application—6 pages.
Communication for Korean Patent Application No. 10-2017-0048893, dated Apr. 16, 2018, 9 Pgs.
Communication in European Patent Office in Application No. 20173922.4, dated Oct. 9, 2020, 7 Pgs.
Communication in Korean Patent Office in Application No. 10-2018-0174192, dated Nov. 25, 2019, 9 Pgs.

(56) References Cited

OTHER PUBLICATIONS

Communication in Korean Patent Office in Application No. 10-2019-0054670, dated Apr. 21, 2020,11 Pgs.
Communication issued in Korean Patent Office in Application No. 10-2018-0012389, dated Jul. 31, 2019, 11 Pgs.
Extended European Search Report for Application No. 18213173.0, dated May 7, 2019, 8 Pgs.
Extended European Search Report for European Application No. 19156400.4, Search completed Apr. 11, 2019, dated Apr. 24, 2019, 11 Pgs.
Extended European Search Report for European Application No. 20199235.1, Search completed Feb. 10, 2021, dated Feb. 19, 2021, 7 Pgs.
Extended European Search Report for European Application No. 21154225.3, Search completed Apr. 20, 2021, dated Apr. 29, 2021, 7 Pgs.
Extended Search Report for European Application No. 21154208.9, Search completed May 21, 2021 , dated Jun. 4, 2021, 9 Pgs.
International Search Report and Written Opinion for International Application No. PCT/KR2018/000787, Search completed Apr. 26, 2018, dated Apr. 26, 2018, 12 Pgs.
International Search Report dated Jan. 18, 2018 in International Application No. PCT/KR2017/011139, in 3 pages.
Korean Office Action for Application No. 10-2017-0181512, dated Mar. 8, 2019, 8 Pgs.
Korean Office Action for Application No. 10-2019-0121524, dated Sep. 22, 2020, 9 Pgs.
Korean Office Action of KR 10-2020-0012270 dated Nov. 30, 2020, 5 Pgs.
Office Action for Japanese Patent Application No. 2020-165934, dated Sep. 24, 2021.
Office Action issued from Korean Patent Application No. 10-2020-0012233, dated Nov. 20, 2020, 5 Pgs.
Office Action issued in Japanese Patent Application No. 2018-238541, dated Dec. 10, 2019, 12 Pgs.
"Talking To Complete Strangers On Holla App! Awkward" (i.e., Vid0), Published Jul. 21, 2018, Available online at https:// www.youtube.corn/watch?v=F9ddBJ4yJZA.
Dou et al., "Coarse-to-Fine Trained Multi-Scale Convolutional Neural Networks for Image Classification", IEEE, 2015, 7Pgs.
Freitas et al., "A Multimodal CNN-Based Tool to Censure Inappropriate Video Scenes", arxiv.org, Cornell University Library, 201 Olin Library Cornell University Ithaca, NY 14853, Nov. 10, 2019, XP081529770.
Sood et al., "Automatic Identification of Personal Insults on Social News Sites", Journal of The American Society for Information Science and Technology, Feb. 1, 2012, vol. 63, No. 2, pp. 270-285. Published Online:—Oct. 28, 2011.

\* cited by examiner

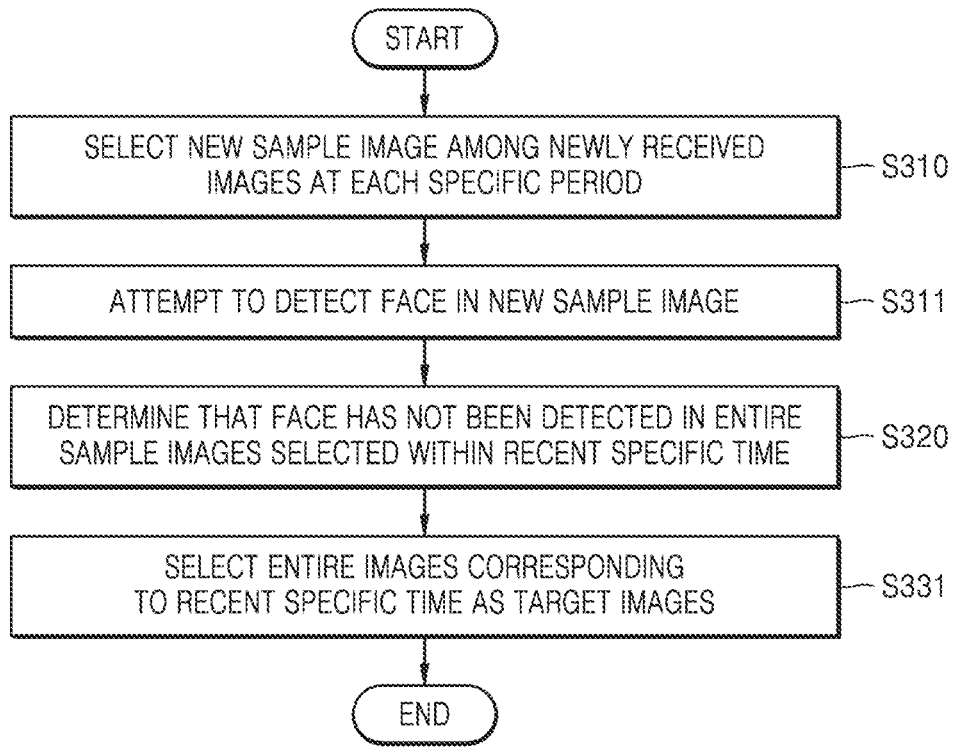
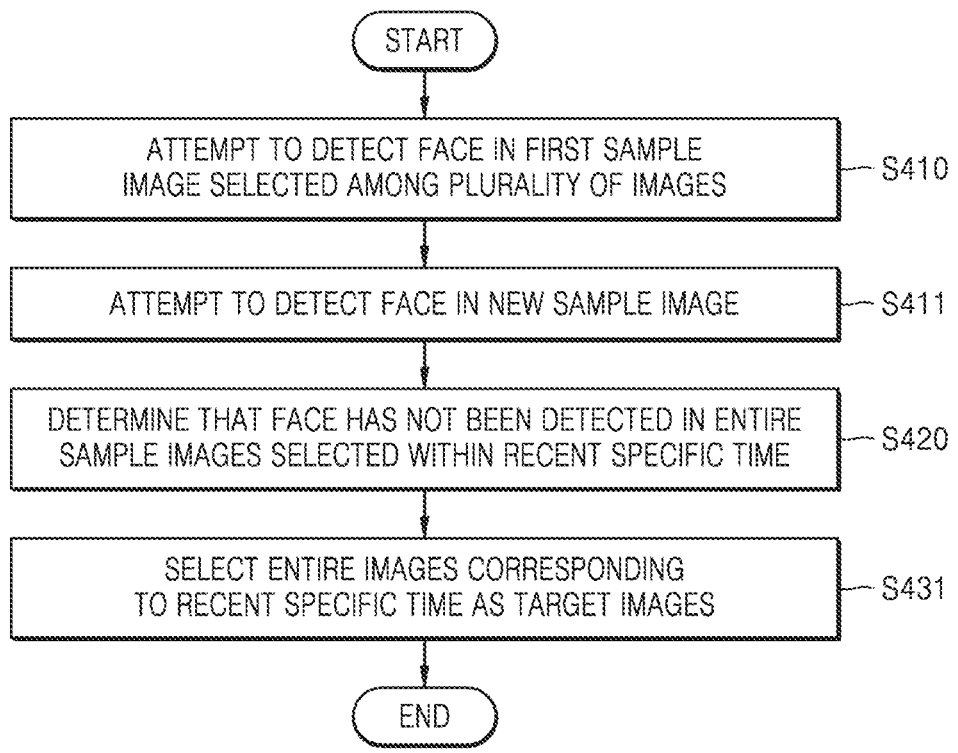

DEVICE AND METHOD OF DISPLAYING IMAGES

CROSS-REFERENCE TO RELATED APPLICATION

This application is a continuation-in-part of U.S. patent application Ser. No. 15/729,520 filed on Oct. 10, 2017, which claims the benefit of Korean Patent Application No. 10-2016-0130656, filed on Oct. 10, 2016, in the Korean Intellectual Property Office, the disclosures of both of which are incorporated herein in their entirety by reference.

BACKGROUND

1. Field

One or more embodiments relate to an image display device and an image display method, which are capable of preventing a user who makes a video call with a counterpart from being exposed to inappropriate images.

2. Description of the Related Art

With the developments of communication technologies and the miniaturization of electronic devices, personal terminals have become widely spread to general customers. In particular, personal portable terminals, such as smart phones or smart tablets, have recently been widely used. Most terminals include a communication function. A user may search on the Internet using a terminal or may exchange messages with another user.

Also, with the developments of small-sized camera technologies, small-sized microphone technologies, small-sized display technologies, and small-sized speaker technologies, most terminals such as smart phones include a camera, a microphone, a display, and a speaker. A user may use the terminal to record a voice or capture a video including a voice. The user may confirm the recorded voice through the speaker included in the terminal or the captured video through the display included in the terminal.

Also, the user may share the recorded voice or the captured video with another user using the communication function of the terminal. The user may send a previously recorded voice or a previously captured video to another user. Also, the user may send a voice or a video, which is being currently recorded or captured by the terminal, to another user in real time.

Also, at the same time, another user may send a voice or a video, which is being currently recorded or captured by his or her own terminal, to the user in real time. The display included in the terminal of the user may simultaneously display the video that is being currently captured by the terminal of the user and the video that is being currently captured by the terminal of another user. Also, the speaker included in the terminal of the user may simultaneously reproduce the voice that is being currently recorded by the terminal of another user. In other words, the user and another user may make a video call to each other using their own terminals.

The user and another user may or may not be acquainted with each other. A plurality of terminals, including the terminal of the user and the terminal of another user, may be connected to a server. The server may mediate between the terminal of the user and the terminal of another user. Therefore, even though the user and another user are not acquainted with each other, the user and another user may make a video call to each other through the mediation of the server.

When the user makes a video call with the counterpart, the user may be exposed to obscene images from the counterpart. In particular, when the user makes a video call with an unacquainted counterpart, it is highly likely that the user will be exposed to obscene images from the counterpart.

For example, a terminal of the user may receive a naked body image of the counterpart, which is captured by a terminal of the counterpart, through a video call session. The terminal of the user displays the received image and thus the user may be exposed to the obscene image. If the user is exposed to the obscene image that the user does not want, the user may feel sexual shame or discomfort.

SUMMARY

Some example embodiments may provide an image display apparatus and an image display method, which are capable of preventing a user who makes a video call with a counterpart from being exposed to obscene images from the counterpart.

Some example embodiments may provide an image display device and an image display method, which are capable of preventing a user who makes a video call with a counterpart from sexual shame or discomfort that the user may feel from images from the counterpart.

Some example embodiments may provide an image display device and an image display method, which are capable of guiding a proper video call between users.

Additional aspects will be set forth in part in the description which follows and, in part, will be apparent from the description, or may be learned by practice of the presented embodiments.

An image display method according to an embodiment includes: receiving, from a first terminal, a stream including a plurality of images captured by the first terminal; determining whether there is an image in which no face is detected among the plurality of images included in the stream; when it is determined that there is the image in which no face is detected, performing image processing on the image in which no face is detected among the plurality of images; and displaying the plurality of images by replacing the image in which no face is detected with the image on which the image processing has been performed.

According to another embodiment, provided is a computer-readable recording medium having recorded thereon a program to execute the image display method in a computer.

An image display device according to another embodiment includes: a communication interface; a user interface; a memory storing instructions; and a processor, wherein the processor is configured to execute the instructions to: receive, from a first terminal through the communication interface, a stream including a plurality of images captured by the first terminal; determine whether there is an image in which no face is detected among the plurality of images included in the stream; when it is determined that there is the image in which no face is detected, perform image processing on the image in which no face is detected among the plurality of images; and display, through the user interface, the plurality of images by replacing the image in which no face is detected with an image on which the image processing has been performed.

BRIEF DESCRIPTION OF THE DRAWINGS

These and/or other aspects will become apparent and more readily appreciated from the following description of the embodiments, taken in conjunction with the accompanying drawings.

FIG. 9 is a flowchart of a process of attempting to detect a face to a process of selecting a target image, according to another embodiment.

FIG. 10 is a flowchart of a process of attempting to detect a face to a process of selecting a target image, according to another embodiment.

DETAILED DESCRIPTION

Advantages and features and a method of achieving the same will be more clearly understood from embodiments described below in detail with reference to the accompanying drawings. However, the present disclosure is not limited to the following embodiments and may be implemented in various different forms. The embodiments are provided merely to complete disclosure and to provide those of ordinary skill in the art with the category of the present disclosure. The present disclosure is defined only by the claims. Wherever possible, the same reference numbers will be used throughout the specification to refer to the same or like components.

Also, it will be understood that although the terms "first", "second", etc. may be used herein to describe various components, these components should not be limited by these terms. These terms are only used to distinguish one component from another. Therefore, a first component used herein may be a second component within the technical scope of the present disclosure.

The terminology used herein is for the purpose of describing particular embodiments only and is not intended to limit the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated components and/or steps, but do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, terminals 100 and 150 and methods of controlling the same, according to embodiments, will be described in detail with reference to FIGS. 1 to 13.

Hereinafter, image display devices 100 and 150 and image display methods, according to embodiments, will be described in detail with reference to FIGS. 1 to 20.

Figure 1:
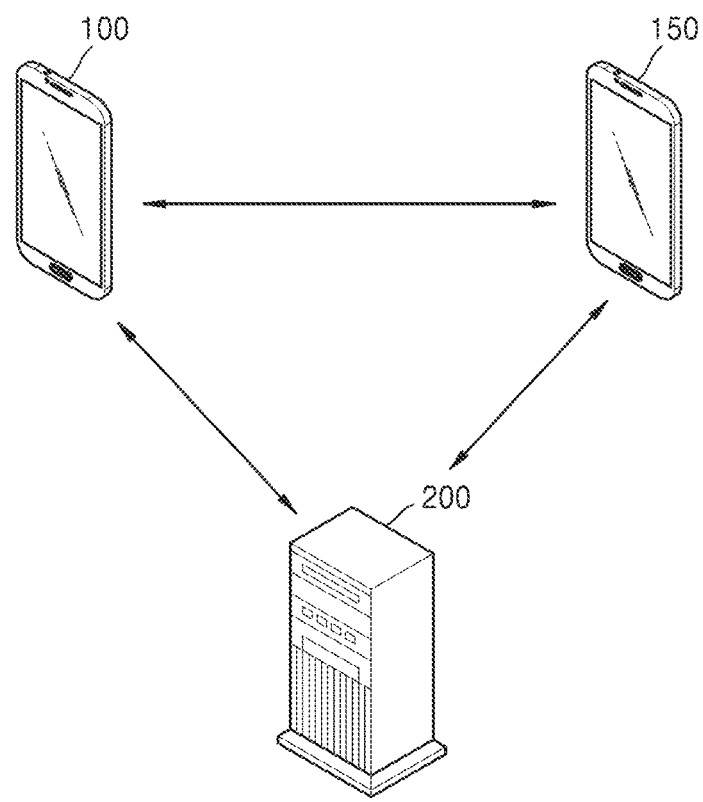
FIG. 1 is a network configuration diagram illustrating an environment in which an image display device according to an embodiment operates.

FIG. 1 is a network configuration diagram illustrating an environment in which image display devices 100 and 150 according to an embodiment operate. Referring to FIG. 1, the environment in which the image display devices 100 and 150 operate may include a first image display device 100, and a second image display device 150 connected to the first image display device 100.

According to another embodiment, the environment in which the image display devices 100 and 150 operate may further include a server 200 connected to the first image display device 100 or the second image display device 150. The environment in which the image display devices 100 and 150 operate may not include the server 200.

The first image display device 100 may be a terminal. For convenience of description, the first image display device 100 and the first terminal 100 are interchangeably used herein.

The first terminal 100 may be, for example, a desktop computer, a laptop computer, a smart phone, a smart tablet, a smart watch, a mobile terminal, a digital camera, a wearable device, or a portable electronic device. The first terminal 100 may execute programs or applications.

The first terminal 100 may be connected to a communication network. The first terminal 100 may be connected to an external device via the communication network. The first terminal 100 may transmit data to the connected external device or receive data from the connected external device.

The communication network connected to the first terminal 100 may include a wired communication network, a wireless communication network, or a composite communication network. The communication network may include a mobile communication network such as 3 G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency IDentification (RFID), Near Field Communication (NFC), ZigBee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

Figure 2:
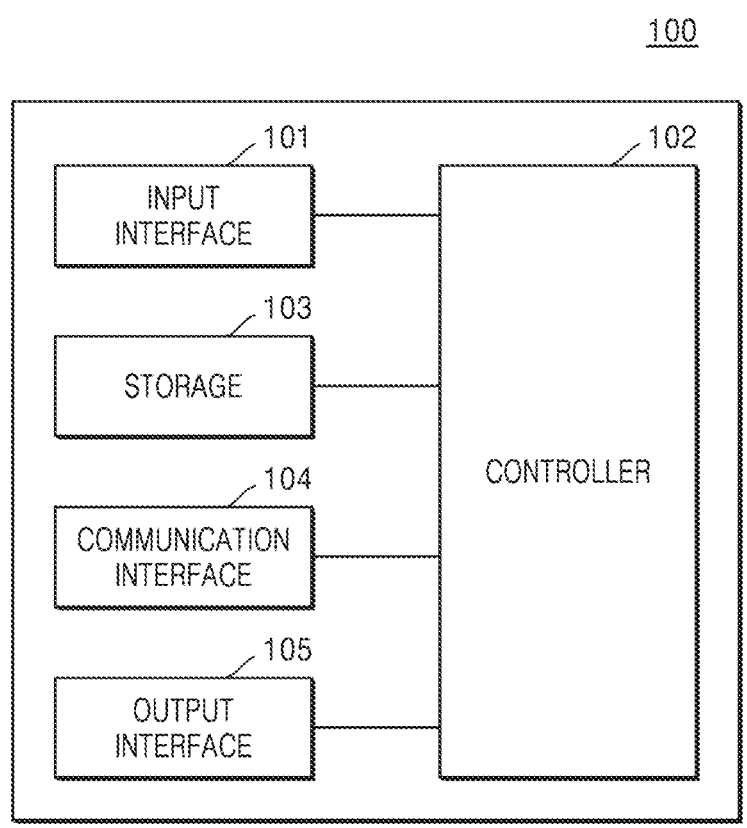
FIG. 2 is a block diagram of an image display device according to an embodiment.

FIG. 2 is a block diagram illustrating the configurations of the image display devices 100 and 150 according to an embodiment. Referring to FIG. 2, each of the image display devices 100 and 150 according to an embodiment may include an input interface 101, a controller 102, a storage 103, a communication interface 104, and an output interface 105.

The input interface 101 may receive an external signal. The input interface 101 may receive signals from users of the image display devices 100 and 150. Also, the input interface 101 may receive a signal from an external device. The input interface 101 may include, for example, a microphone, a camera, a keyboard, a mouse, a track ball, a touch screen, a button, a switch, a sensor, a network interface, or other input devices.

The input interface 101 may receive light from the exterior through the camera included in the input interface 101. The input interface 101 may receive light emitted from an external object or light reflected from an external object. The input interface 101 may capture images of the users of the image display devices 100 and 150 through the camera.

The input interface 101 may receive a voice from the exterior through the microphone included in the input interface 101. The input interface 101 may receive voices from the users of the image display devices 100 and 150. Also, the input interface 101 may receive voices from an external voice reproduction device. The input interface 101 may record voices of the users of the image display devices 100 and 150 through the microphone.

The controller 102 may control operations of the image display devices 100 and 150. The controller 102 may be connected to the components included in the image display devices 100 and 150. The controller 102 may control operations of the components included in the image display devices 100 and 150.

The controller 102 may process a signal. The controller 102 may process a signal received by the input interface 101. For example, the controller 102 may process a user's request received through the input interface 101. The controller 102 may process an image of a user captured by the camera included in the input interface 101. The controller 102 may process a user's voice recorded by the microphone included in the input interface 101.

The controller 102 may process a signal received by the communication interface 104. For example, the controller 102 may process a user's request received through the communication interface 104. The controller 102 may process an image or voice of another user received through the communication interface 104.

The controller 102 may control the operations of the image display devices 100 and 150 in response to a signal received by the input interface 101. The controller 102 may control the operations of the image display devices 100 and 150 in response to a user's request received through the input interface 101.

The controller 102 may perform an arithmetic operation. The controller 102 may perform an arithmetic operation according to a signal received by the input interface 101. The controller 102 may perform an arithmetic operation using a signal received by the input interface 101 or data stored in the storage 103. For example, the controller 102 may encode an image captured by the camera included in the input interface 101. The controller 102 may encode a voice recorded by the microphone included in the input interface 101.

The controller 102 may decode an image or voice of another user received through the communication interface 104. The controller 130 may perform postprocessing on the decoded image or voice. For example, the controller 102 may perform image processing on an image of another user received through the communication interface 104.

The controller 102 may perform control such that the result of the arithmetic operation is stored in the storage 103. The controller 102 may perform control such that the result of the arithmetic operation is output by the output interface 105.

The controller 102 may include, for example, a central processing unit (CPU), a graphic processing unit (GPU), a micro controller unit (MCU), or a microprocessor.

The storage 103 may store data. The storage 103 may store data to be used when the controller 102 performs the arithmetic operation. The storage 103 may store the result of the arithmetic operation performed by the controller 102. For example, the storage 103 may store an image or a voice encoded by the controller 102. The storage 103 may store data to be transmitted to the exterior through the communication interface 104, or may store data received from the exterior through the communication interface 104.

The storage 103 may include a volatile memory or a non-volatile memory. The storage 103 may include, for example, flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), register, or the like. The storage 103 may include, for example, a file system, a database, or an embedded database.

The communication interface 104 may transmit data to the exterior or receive data from the exterior. The communication interface 104 may transmit data to another image display terminal 100 or 150 or the server 200. The communication interface 104 may transmit data to another image display device 100 or 150 or the server 200. The communication interface 104 may transmit the result of the arithmetic operation performed by the controller 102 to the exterior. Also, the communication interface 104 may transmit data stored in the storage 103 to the exterior. The communication interface 104 may receive external data to be used when the controller 102 performs the arithmetic operation.

Data to be transmitted by the communication interface 104 or data received by the communication interface 104 may be stored in the storage 103. For example, the communication interface 104 may transmit an encoded image or voice stored in the storage 103 to the server 200 or another image display device 100 or 150. Also, the communication interface 104 may receive an image or a voice encoded by another terminal 100 or 150 from another terminal 100 or 150.

The communication interface 104 may include a long-range network interface such as a 3G module, an LTE module, an LTE-A module, a Wi-Fi module, a WiGig module, an Ultra Wide Band (UWB) module, or a LAN card. Also, the communication interface 104 may include a short-range network interface such as an MST module, a Bluetooth module, an NFC module, an RFID module, a ZigBee module, a Z-Wave module, or an IR module. In addition, the communication interface 104 may include other network interfaces.

The output interface 105 may output a signal to the exterior. The output interface 105 may, for example, display a screen, reproduce a sound, or output a vibration. The output interface 105 may include a display, a speaker, a vibrator, an oscillator, or other output devices.

The output interface 105 may display a screen. The controller 102 may control the output interface 105 to display a screen. The output interface 105 may display a user interface. The output interface 105 may display another screen in response to a user input.

The output interface 105 may display data. The output interface 105 may display the result of the arithmetic operation performed by the controller 102. The output interface 105 may display data stored in the storage 103. The output interface 105 may display data received by the communication interface 104.

The output interface 105 may include a flat-panel display device such as a liquid crystal display (LCD), an organic light-emitting diode (OLED), or a plasma display panel (PDP). The output interface 105 may include a curved display or a flexible display. The output interface 105 may include a touch screen.

The output interface 105 may display the image of the user captured by the first image display device 100 or the image of another user captured by the second image display device 150. Also, the output interface 105 may reproduce the voice of the user recorded by the first image display device 100 or the voice of another user captured by the second image display device 150.

The second image display device 150 may be a terminal. For convenience of description, the second image display device 150 and the second terminal 150 are interchangeably used herein.

A type of the second terminal 150 may be identical to or different from a type of the first terminal 100. The second terminal 150 may execute programs or applications.

The second terminal 150 may be connected to a communication network. The second terminal 150 may be connected to an external device via the communication network. The second terminal 150 may transmit data to the connected external device or receive data from the connected external device.

The second terminal 150 may be connected to the first terminal 100. The second terminal 150 may be connected to the first terminal 100 via the communication network. The second terminal 150 may transmit data to the first terminal 100 or receive data from the first terminal 100.

The first terminal 100 and the second terminal 150, which are connected to each other, may exchange messages, files, voice data, images, or videos with each other. The second terminal 150 may establish a voice call session or a video call session with the first terminal 100. The video call session may be established using, for example, Transmission Control Protocol (TCR), User Datagram Protocol (UDP), or Web Real-Time Communication (WebRTC). The user of the first terminal 100 and the user of the second terminal 150 may make a voice call or a video call with each other.

The video call session may be directly established between the first terminal 100 and the second terminal 150. According to another embodiment, the video call session may be established between the first terminal 100 and the second terminal 150 via at least one device. For example, the video call session may include a session established between the first terminal 100 and the server 200 and a session established between the server 200 and the second terminal 150.

The first terminal 100 and the second terminal 150 may directly exchange data with each other. Also, the first terminal 100 and the second terminal 150 may exchange data with each other via the server 200 or another mediating device.

The server 200 may be connected to the first terminal 100 or the second terminal 150. When the server 200 is connected to the first terminal 100, the server 200 may exchange data with the first terminal 100 via the communication network. When the server 200 is connected to the second terminal 150, the server 200 may exchange data with the second terminal 150 via the communication network.

The server 200 may receive data from the first terminals 100. The server 200 may perform an arithmetic operation using the data received from the first terminal 100. The server 200 may transmit the result of the arithmetic operation to the first terminal 100 or the second terminal 150. The server 200 may receive data from the second terminals 150. The server 200 may perform an arithmetic operation using the data received from the second terminal 150. The server 200 may transmit the result of the arithmetic operation to the first terminal 100 or the second terminal 150.

Hereinafter, specific operations of the image display devices 100 and 150, which perform image display methods, according to an embodiment will be described in detail with reference to FIGS. 3 to 20.

Figure 3:
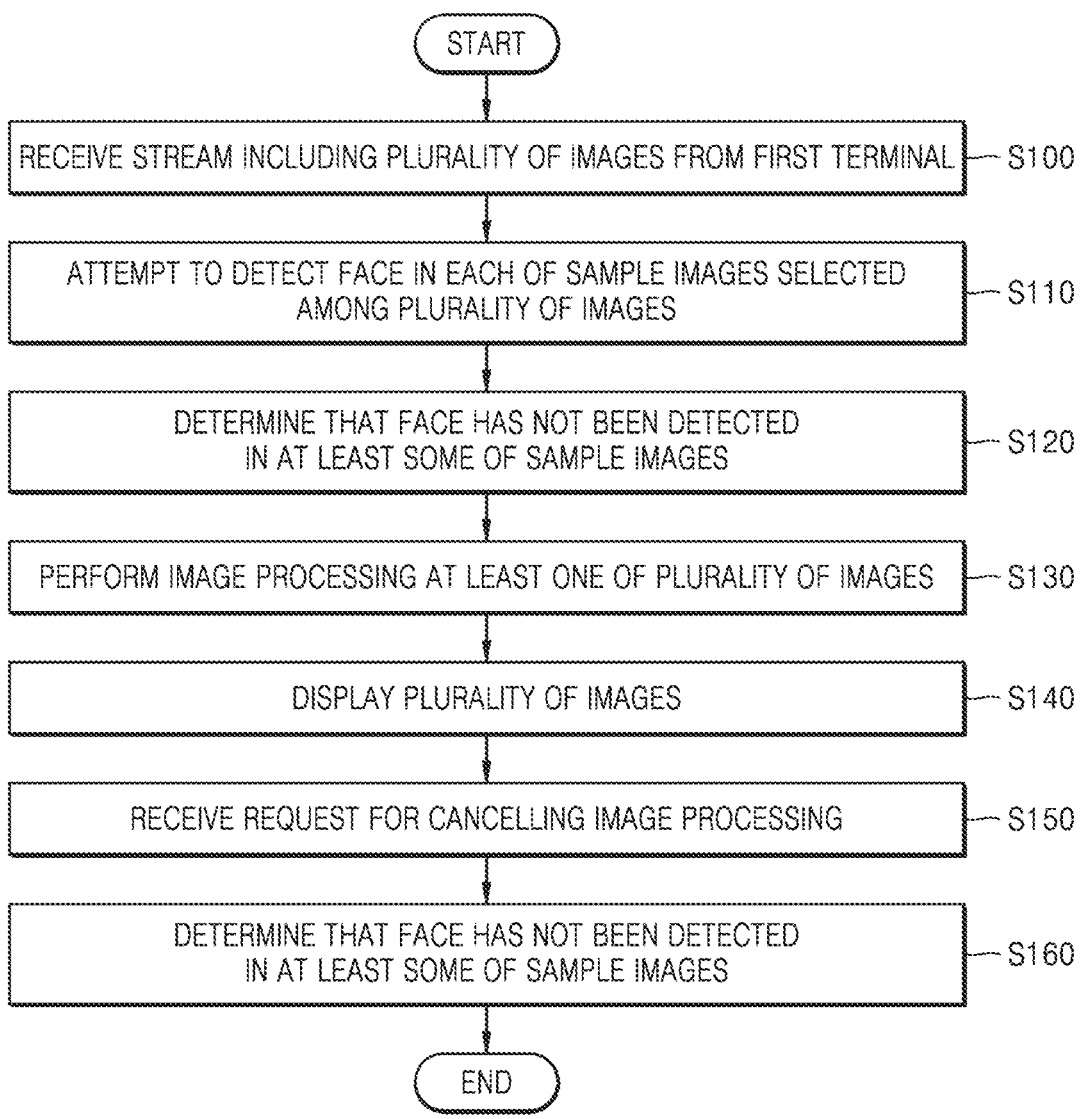
FIG. 3 is a flowchart of an image display method according to an embodiment.

FIG. 3 is a flowchart of an image display method according to an embodiment. Referring to FIG. 3, in operation S100, a stream including a plurality of images captured by the first terminal 100 may be received from the first terminal 100.

The communication interface 104 of the second terminal 150 may establish a video call session with the first terminal 100. The communication interface 104 of the second terminal 150 may receive the stream from the first terminal 100 through the video call session. The stream may include a plurality of images. For example, the stream may include a video or at least two still images.

The plurality of images included in the stream may be images captured by the camera included in the input interface 101 of the first terminal 100. The second terminal 150 may continuously receive a plurality of images, which are being continuously captured by the first terminal 100, through the stream.

The plurality of images may be images of the user of the first terminal 100. For example, the plurality of images may include an image of a face of the user of the first terminal 100. The plurality of images may be an image of a body of the user of the first terminal 100.

The second terminal 150 may directly receive the stream from the first terminal 100. According to another embodiment, the second terminal 150 may receive the stream from the first terminal 100 via the server 200.

In operation S110, face detection may be attempted in each of one or more sample images selected among the plurality of images included in the stream. The controller 102 of the second terminal 150 may select one or more sample images among the plurality of images included in the stream. The controller 102 of the second terminal 150 may select a sample image among the plurality of images randomly or according to a specific rule.

For example, the controller 102 of the second terminal 150 may select a new sample image among newly received images in the stream at each specific period. The controller 102 of the second terminal 150 may select a new sample image among the entire images received later than the most recently selected sample image in the stream. The controller 102 of the second terminal 150 may select the new sample image randomly or according to a specific rule.

The controller 102 of the second terminal 150 may attempt to detect the face in each of the selected one or more sample images. The controller 102 of the second terminal 150 may detect whether a portion corresponding to a face of a person exists in one image using an open source library such as Open Source Computer Vision (OpenCV) or other commercial programs. The controller 102 of the second terminal 150 may detect whether the portion corresponding to the face exists with respect to each sample image.

Figure 4:
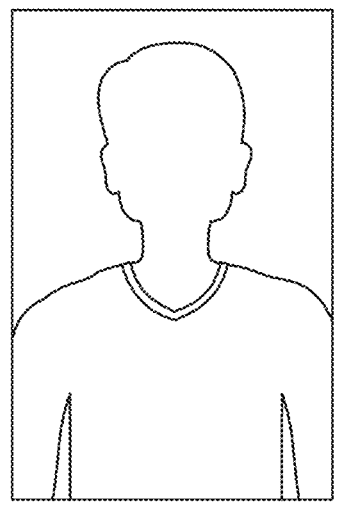
FIG. 4 illustrates a sample image selected among a plurality of images included in a stream, according to an embodiment.
Figure 5:
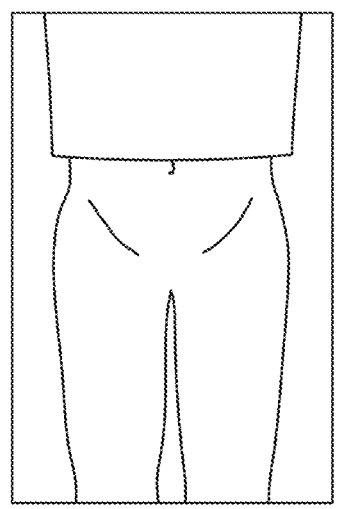
FIG. 5 illustrates another sample image selected among a plurality of images included in a stream, according to an embodiment.

FIG. 4 illustrates a sample image selected among the plurality of images included in the stream, according to an embodiment. Also, FIG. 5 illustrates another sample image selected among the plurality of images included in the stream, according to an embodiment. The controller 102 of the second terminal 150 may attempt to detect a face in each of the sample image of FIG. 4 and the sample image of FIG. 5.

Referring to FIG. 3 again, in operation S120, it may be determined that the face has not been detected in at least some of the sample images. The controller 102 of the second terminal 150 may determine whether a portion corresponding to a face exists with respect to each sample image. As the determination result, the controller 102 of the second terminal 150 may determine that the face has not been detected in at least one of the sample images.

For example, the controller 102 of the second terminal 150 may determine that the face has been detected in a sample image corresponding to an upper body of the user of the first terminal 100, like in the image of FIG. 4. On the other hand, the controller 102 of the second terminal 150 may determine that the face has not been detected in a sample image corresponding to a lower body of the user of the first terminal 100, like in the image of FIG. 5.

Referring to FIG. 3 again, in operation S130, image processing may be performed on at least one of the plurality of images included in the stream. When it is determined that the face has not been detected in at least some of the sample images, it may be determined that the plurality of images received from the first terminal 100 include obscene images. For example, when an image such as the image of FIG. 5 is included in the plurality of images received from the first terminal 100, it may be determined that the plurality of images include obscene images.

The controller 102 of the second terminal 150 may perform image processing on at least one of the plurality of images so as to prevent the user of the second terminal 150 from being exposed to the obscene images. The controller 102 of the second terminal 150 may perform image processing on all the plurality of images or some images selected among the plurality of images.

Figure 6:
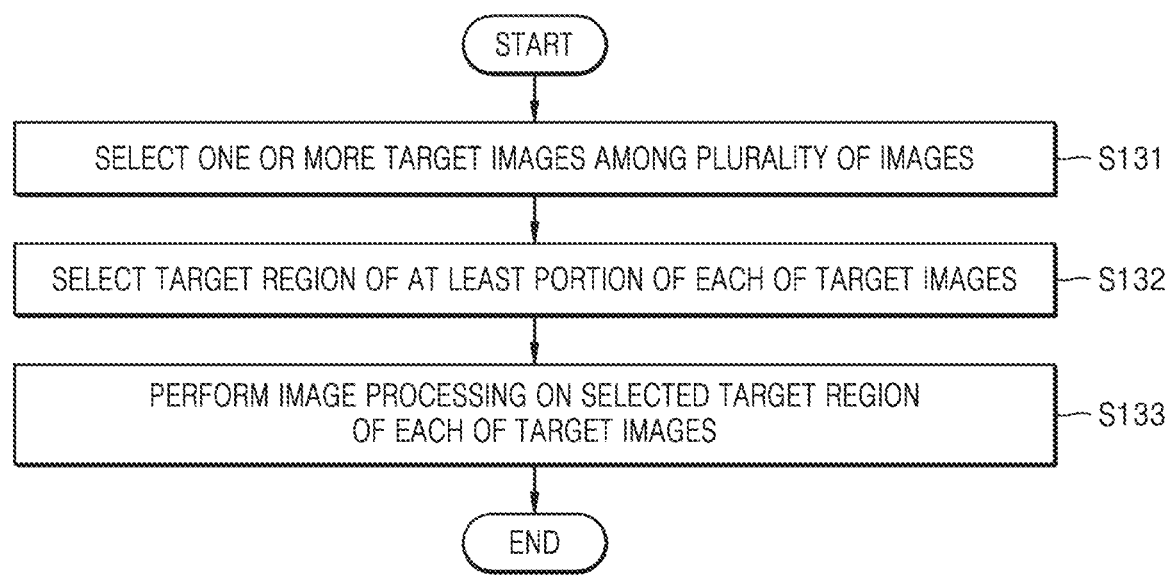
FIG. 6 is a flowchart of a process of processing an image, according to an embodiment.

FIG. 6 is a flowchart of operation S130 of performing the image processing, according to an embodiment. Referring to FIG. 6, in operation S131, one or more target images may be selected among the plurality of images included in the stream.

The controller 102 of the second terminal 150 may select one or more target images, on which image processing is to be performed, among the plurality of images. For example, the controller 102 of the second terminal 150 may select all the plurality of images included in the stream as the target images.

According to another embodiment, the controller 102 of the second terminal 150 may perform image processing on one or more images corresponding to the sample image, in which it is determined that the face has not been detected, among the plurality of images. The images corresponding to the sample image may be the entire images received within a specific time range from the time at which the sample image has been received among the plurality of images.

For example, it is assumed that twenty images per second are continuously received through the stream. Also, it is assumed that the most recently received image is selected as a new sample image whenever a period of 4 seconds is returned. Also, it is assumed that it has been determined that the face has not been detected in two sample images. The time when the two sample images have been received may be a time point of 24 seconds and a time point of 32 seconds. The images corresponding to the two sample images may be about eighty images received within a time range from a time point of 22 seconds to a time point of 26 seconds and about eighty images received in a time range from a time point of 30 seconds to a time point of 34 seconds.

Figure 7:
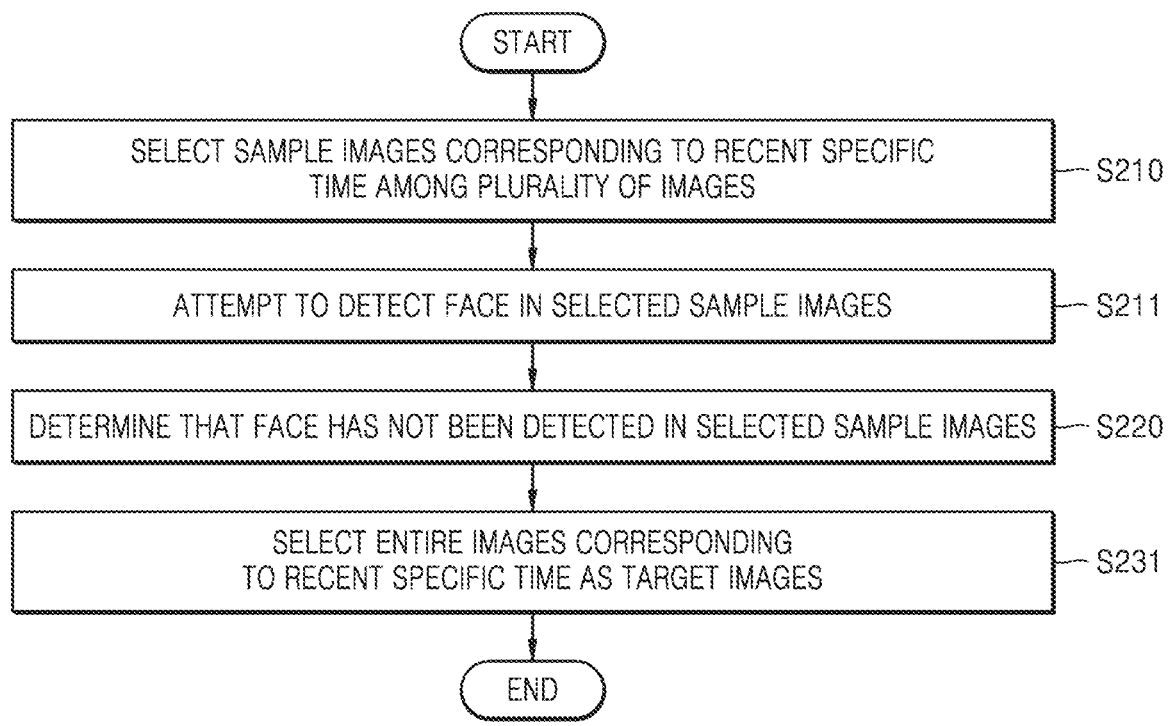
FIG. 7 is a flowchart of a process of attempting to detect a face to a process of selecting a target image, according to an embodiment.

A method by which the controller 102 of the second terminal 150 selects the sample image and a method by which the controller 102 of the second terminal 150 selects the target image may be changed according to embodiments. FIG. 7 is a flowchart of operation S110 of attempting to detect the face to operation S131 of selecting the target image, according to an embodiment.

Referring to FIG. 7, in operation S210, one or more sample images corresponding to a recent specific time may be selected among the plurality of images included in the stream. The controller 102 of the second terminal 150 may select one or more sample images among the images received for the recent specific time in the stream.

Figure 8:
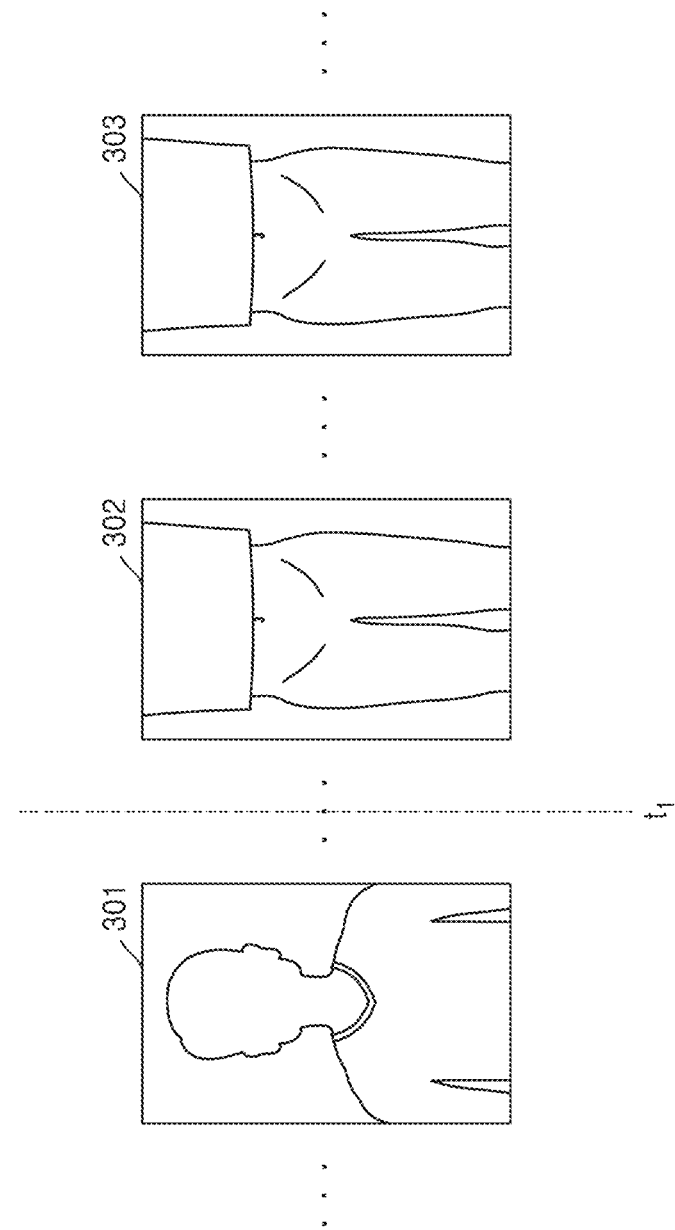
FIG. 8 is a reference diagram for describing a process of selecting a sample image, according to an embodiment.

For example, the controller 102 of the second terminal 150 may select two sample images among images received for the last one second. FIG. 8 is a reference diagram for describing a process of selecting a sample image, according to an embodiment. Referring to FIG. 8, a first image 301 in the stream may have been already selected as a sample image in the past. The controller 102 of the second terminal 150 may additionally select a second image 302 and a third image 303, as the sample image, among images received after a first time point t1 which is a time point before a specific time from a current time.

Referring to FIG. 7 again, in operation S211, the face detection may be attempted in the selected one or more sample images. The controller 102 of the second terminal 150 may detect whether a portion corresponding to a face exists with respect to each selected sample image. For example, the controller 102 of the second terminal 150 may attempt to detect a face in the second image 302 and the third image 303.

In operation S220, it may be determined that the face has not been detected in the selected one or more sample images. The controller 102 of the second terminal 150 may determine that the portion corresponding to the face does not exist in the selected sample images.

When the portion corresponding to the face does not exist in the entire selected sample images, the controller 102 of the second terminal 150 may determine that the face has not been detected. According to another embodiment, when the portion corresponding to the face does not exist in at least one of the selected sample images, the controller 102 of the second terminal 150 may determine that the face has not been detected. For example, the controller 102 of the second terminal 150 may determine that the face has not been detected in the second image 302 and the third image 303.

In operation S231, the entire images corresponding to the recent specific time among the plurality of images included in the stream may be selected as the target images. For example, the controller 102 of the second terminal 150 may select the entire images received for the last one second as the target images. For example, when twenty images per second are continuously received through the stream, the controller 102 of the second terminal 150 may select the about twenty images received for the last one second as the target images. Referring to FIG. 8, the controller 102 of the second terminal 150 may select, as the target images, the entire images (including the second image 302 and the third image 303) received after a time point t1 which is a time point before a specific time from a current time.

FIG. 9 is a flowchart of operation S110 of attempting to detect the face to operation S131 of selecting the target image, according to another embodiment. Referring to FIG. 9, in operation S310, a new sample image may be selected among images newly received in the stream at each specific period. The controller 102 of the second terminal 150 may select one or more new sample images among the entire images received later than the most recently selected sample image at each specific period.

For example, the controller 102 of the second terminal 150 may select two new sample images per second. Referring to FIG. 8, the controller 102 of the second terminal 150 may select, as the new sample images, the second image 302 and the third image 303 among the entire images received later than the first image 301.

Referring to FIG. 9 again, in operation S311, the face detection may be attempted in the new sample image whenever the new sample image is selected. The controller 102 of the second terminal 150 may attempt to detect the face in the newly selected sample image at each specific period.

In operation S320, it may be determined that the face has not been detected in the entire sample images selected within the recent specific time among the sample images. For example, the controller 102 of the second terminal 150 may determine that the face has not been detected in two sample images selected within the last one second. In other words, the controller 102 of the second terminal 150 may determine that the face has not been detected in the second image 302 and the third image 303.

In operation S331, the entire images corresponding to the recent specific time among the plurality of images included in the stream may be selected as the target images. For example, the controller 102 of the second terminal 150 may select the entire images received for the last one second as the target images. For example, when twenty images per second are continuously received through the stream, the controller 102 of the second terminal 150 may select the about twenty images received for the last one second as the target images. Referring to FIG. 8, the controller 102 of the second terminal 150 may select, as the target images, the entire images (including the second image 302 and the third image 303) received after a time point t1 which is a time point before a specific time from a current time.

FIG. 10 is a flowchart of operation S110 of attempting to detect the face to operation S431 of selecting the target image, according to another embodiment. Referring to FIG. 10, in operation S410, the face detection may be attempted in a first sample image selected among the plurality of images included in the stream. The controller 102 of the second terminal 150 may select the first sample image among the plurality of images. The controller 102 of the second terminal 150 may detect whether a portion corresponding to a face exists in the first sample image.

Figure 11:
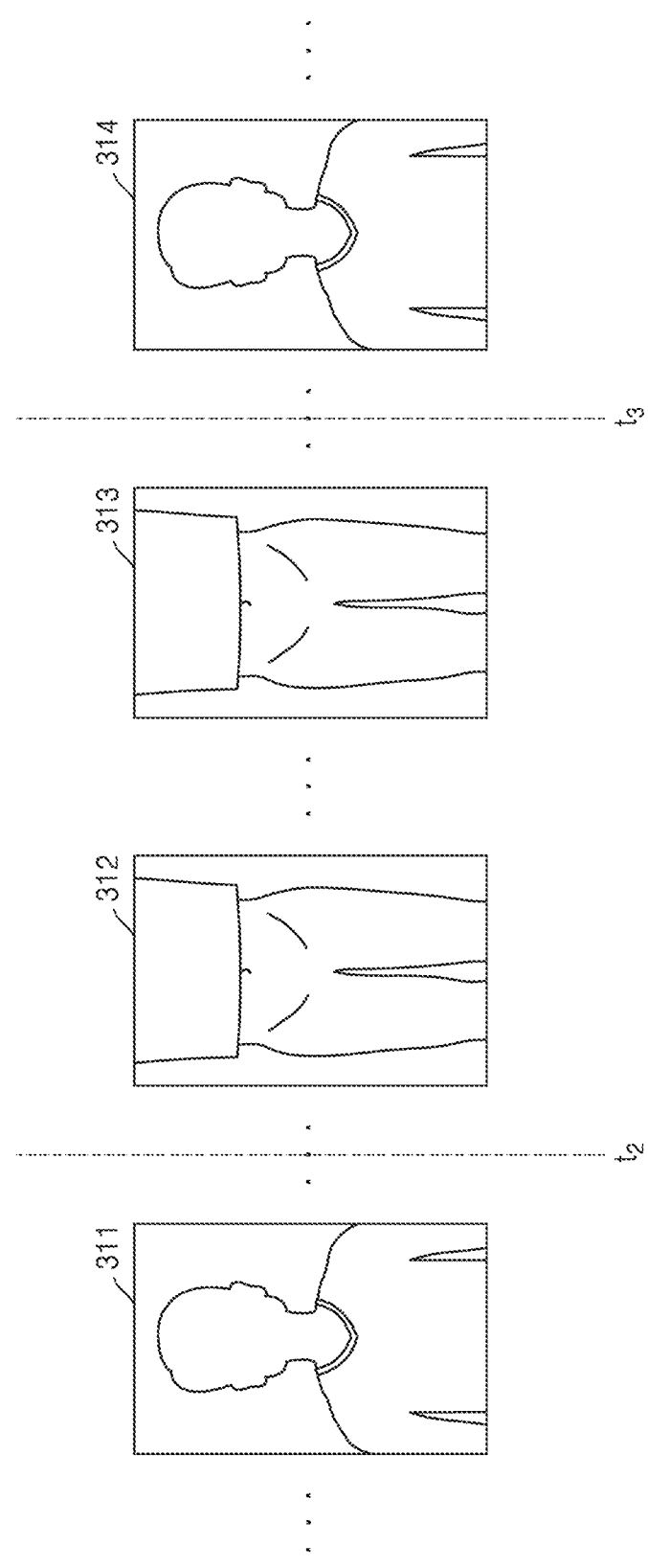
FIG. 11 is a reference diagram for describing a process of selecting a sample image, according to another embodiment.

FIG. 11 is a reference diagram for describing a process of selecting a sample image, according to another embodiment. Referring to FIG. 11, a fourth image 311 in the stream may have been already selected as a sample image in the past. The controller 102 of the second terminal 150 may select a fifth image 312 as the first sample image among the images received later than the fourth image 311.

In operation S411, the face defection may be attempted in each of one or more second sample images selected among the entire images received later than the first sample image in the stream. The controller 102 of the second terminal 150 may select one or more second sample images among the images received later than the first sample image. The controller 102 of the second terminal 150 may detect whether a portion corresponding to a face exists in each of the second sample images.

For example, referring to FIG. 11, the controller 102 of the second terminal 150 may select a sixth image 313 as the second sample image among the images received later than the fifth image 312. The controller 102 of the second terminal 150 may detect whether a portion corresponding to a face exists in the sixth image 313.

As another example, the controller 102 of the second terminal 150 may select two images as the second sample images. The two images may include the sixth image 313, and another image received later than the fifth image 312 and received earlier than the sixth image 313. The controller 102 of the second terminal 150 may detect whether a portion corresponding to a face exists in each of the two images.

Referring to FIG. 10 again, in operation S420, it may be determined that the face has not been detected in the first sample image and all the one or more second sample images. The controller 102 of the second terminal 150 may determine that the face has not been detected in the first sample image and the second sample image. For example, the controller 102 of the second terminal 150 may determine that the face has not been detected in the fifth image 312 and the sixth image 313.

In operation S431, the images corresponding to the first sample image and the second sample image among the plurality of images included in the stream may be selected as the target images. The controller 102 of the second terminal 150 may select the images corresponding to the first sample image and the second sample image as the target images.

For example, the images corresponding to the first sample image and the second sample image may include the first sample image and the entire images received later than the first sample image among the plurality of images. Referring to FIG. 11, the controller 102 of the second terminal 150 may select, as the target images, the fifth image 312 and the entire images received later than the fifth image 312.

According to another embodiment, the selected target images may include the first sample image, the one or more second sample images, and neighboring images. The neighboring images may be the entire images received later than the first sample image and received earlier than the last received image among the one or more second sample images. Referring to FIG. 11, the controller 102 of the second terminal 150 may select, as the target images, the fifth image 312, the sixth image 313, and the entire images received later than the fifth image 312 and received earlier than the sixth image 313.

Figure 12:
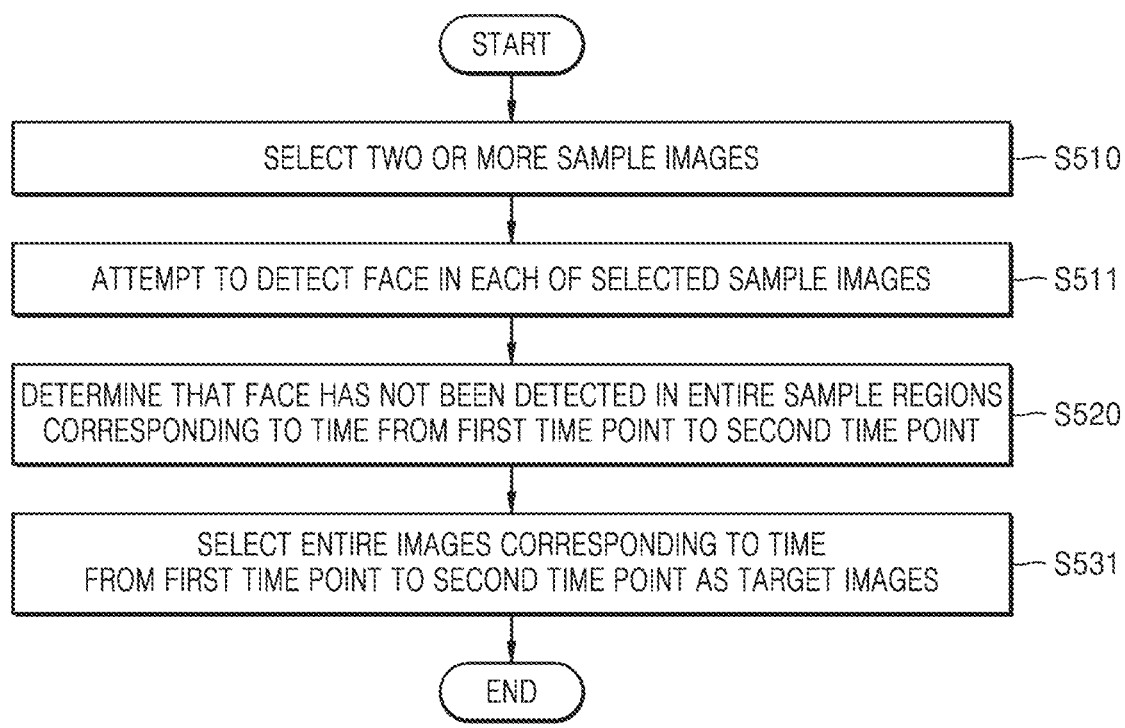
FIG. 12 is a flowchart of a process of attempting to detect a face to a process of selecting a target image, according to another embodiment.

FIG. 12 is a flowchart of operation S110 of attempting to detect the face to operation S131 of selecting the target image, according to another embodiment. Referring to FIG. 12, in operation S510, two or more sample images may be selected among the plurality of images included in the stream, wherein the two or more sample images include a first sample image corresponding to a first time point and a second sample image corresponding to a second time point having a time difference from the first time point by a specific time or more.

The controller 102 of the second terminal 150 may select the first sample image among the plurality of images included in the stream. The time at which the first sample image has been received may be the first time point. The controller 102 of the second terminal 150 may select, as the second sample image, an image received after elapse of more than a specific time from the time at which the first sample image has been received. In other words, the time difference between the time at which the first sample image has been received and the time at which the second sample image has been received may be more than the specific time. The specific time may be, for example, one second.

Also, the controller 102 of the second terminal 150 may additionally select a sample image among the images received earlier than the first sample image. Also, the controller 102 of the second terminal 150 may additionally select a sample image among the images received later than the first sample image and received earlier than the second sample image. Also, the controller 102 of the second terminal 150 may additionally select a sample image among the images received later than the second sample image.

For example, referring to FIG. 11, the controller 102 of the second terminal 150 may select, as the first sample image, an image received at an arbitrary second time point t2 in the stream. The controller 102 of the second terminal 150 may select, as the second sample image, an image received at a third time point t3 among the images received after elapse of more than one second from the second time point t2.

The controller 102 of the second terminal 150 may additionally select a fourth image 311 as the sample image among the images received earlier than the second time point t2. The controller 102 of the second terminal 150 may additionally select a fifth image 312 and a sixth image 313 as the sample images among the images received later than the second time point t2 and received earlier than the third time point t3. The controller 102 of the second terminal 150 may additionally select a seventh image 314 as the sample image among the images received later than the third time point t3.

Referring to FIG. 12 again, in operation S511, the face detection may be attempted in each of the selected two or more sample images. The controller 102 of the second terminal 150 may attempt to detect the face in the first sample image, the second sample image, and all the additionally selected sample images In operation S520, it may be determined that the face has not been detected in the first sample image, the second sample image, and the entire sample images corresponding to the time from the first time point to the second time point among the selected two or more sample images. The controller 102 of the second terminal 150 may determine that the face has not been detected in the first sample image received at the second time point t2. Also, the controller 102 of the second terminal 150 may determine that a portion corresponding to a face has not been detected in the second sample image received at the third time point t3. Also, the controller 102 of the second terminal 150 may determine that the face has not been detected in the fifth image 312 and the sixth image 313 selected as the sample images among the images received later than the second time point t2 and received earlier than the third time point t3. In other words, the controller 102 of the second terminal 150 may determine that the face has not been detected in the sample images received from the second time point t2 to the third time point t3 among the selected entire sample images.

In operation S531, the entire images corresponding to the time from the first time point to the second time point among the plurality of images included in the stream may be selected as the target images. For example, the controller 102 of the second terminal 150 may select, as the target images, the entire images received for the time from the second time point t2 to the third time point t3. The selected target images may include the first sample image, the second sample image, and the sample images received later than the second time point t2 and received earlier than the third time point t3. Also, the selected target images may include all the remaining images, which are not selected as the sample images, among the entire images received later than the second time point t2 and received earlier than the third time point t3 in the stream.

Figure 13:
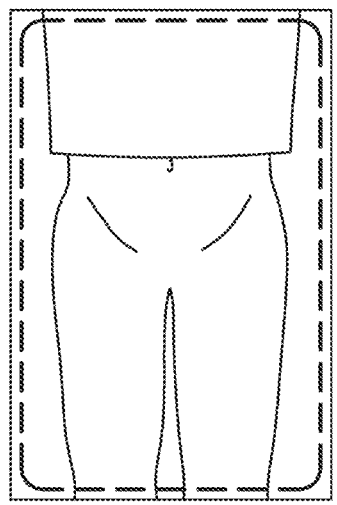
FIG. 13 is a reference diagram illustrating a selected target region according to an embodiment.

Referring to FIG. 6 again, after operation S131 of selecting the target images, operation S132 of selecting al target region of at least a portion of each of the target images. FIG. 13 is a reference diagram illustrating a selected target region according to an embodiment. As illustrated in FIG. 13, the controller 102 of the second terminal 150 may select the entire region of each of the target images as the target region.

According to another embodiment, the controller 102 of the second terminal 150 may select, as the target region, a region corresponding to a skin color in each of the target images. The controller 102 of the second terminal 150 may detect the region corresponding to the skin color in each of the target images. The skin color may indicate at least one color. Since each person has a different skin color, the controller 102 of the second terminal 150 may detect regions corresponding to various skin colors.

Figure 14:
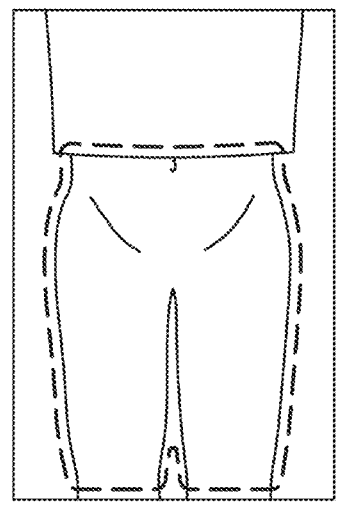
FIG. 14 is a reference diagram illustrating a selected target region according to another embodiment.

FIG. 14 is a reference diagram illustrating a selected target region according to another embodiment. As illustrated in FIG. 14, the controller 102 of the second terminal 150 may select a region having a skin color in a target image as the target region. In other words, each pixel included in the selected target region may have a skin color.

The controller 102 of the second terminal 150 may select one or more closed curves in each of the target images as the target region. For example, unlike in FIG. 14, the region having the skin color may include a plurality of closed curves adjacent to or spaced apart from each other The controller 102 of the second terminal 150 may select the entire closed curves as the target region. According to another embodiment, the controller 102 of the second terminal 150 may select, as the target region, one or more closed curves having the largest area among the plurality of closed curves.

Figure 15:
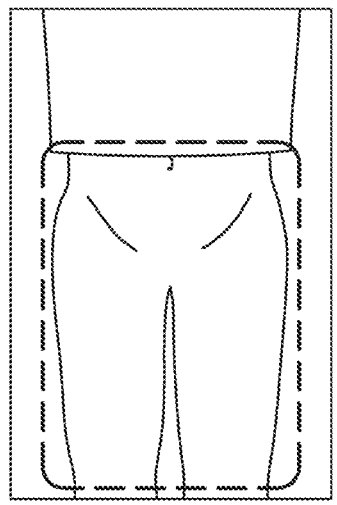
FIG. 15 is a reference diagram illustrating a selected target region according to another embodiment.

FIG. 15 is a reference diagram illustrating a selected target region according to another embodiment. As illustrated in FIG. 15, the controller 102 of the second terminal 150 may select, as the target image, a rectangular region including a region having a skin color in the target image. According to another embodiment, the controller 102 of the second terminal 150 may select, as the target image, a circular, oval, or polygonal region including the region having the skin color, instead of the rectangular region.

The controller 102 of the second terminal 150 may select one or more polygonal regions in each target image as the target region. For example, unlike in FIG. 15, the region having the skin color may include a plurality of closed curves adjacent to or spaced apart from each other The controller 102 of the second terminal 150 may select one polygonal region including the entire closed curves as the target region. According to another embodiment, the controller 102 of the second terminal 150 may select a plurality of polygonal regions as the target region. Each of the polygonal regions may include at least one of the plurality of closed curves. According to another embodiment, the controller 102 of the second terminal 150 may select, as the target region, one or more polygonal regions including one or more closed curves having the largest area among the plurality of closed curves.

Figure 16:
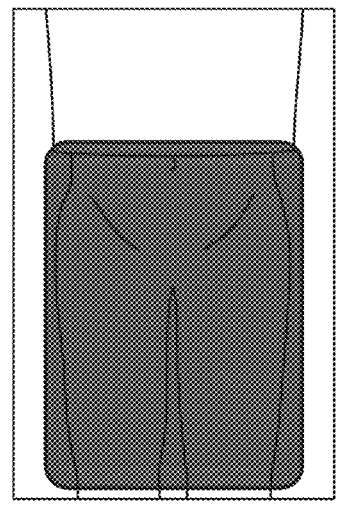
FIG. 16 illustrates an image, on which image processing has been performed, according to an embodiment.

Referring to FIG. 6 again, in operation S133, the image processing may be performed on the selected target region of each of the target images. FIG. 16 illustrates an image, on which the image processing has been performed, according to an embodiment. As illustrated in FIG. 16, the controller 102 of the second terminal 150 may delete the selected target region in the target image, like in FIG. 15.

Figure 17:
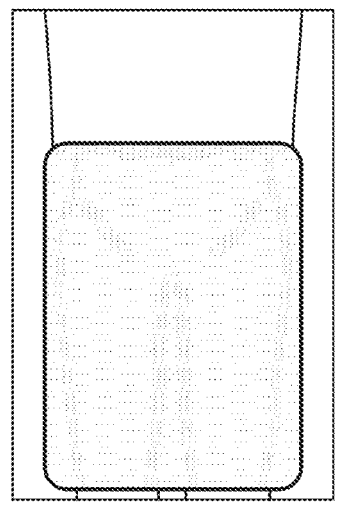
FIG. 17 illustrates an image, on which image processing has been performed, according to another embodiment.
Figure 18:
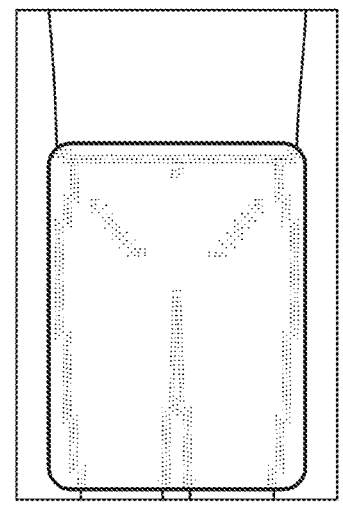
FIG. 18 illustrates an image, on which image processing has been performed, according to another embodiment.
Figure 19:
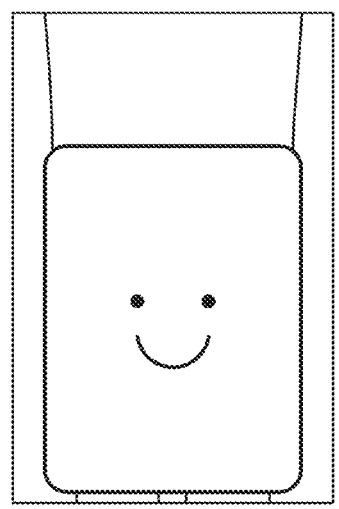
FIG. 19 illustrates an image, on which image processing has been performed, according to another embodiment.

FIG. 17 illustrates an image, on which the image processing has been performed, according to another embodiment. As another example, as illustrated in FIG. 17, the controller 102 of the second terminal 150 may apply a blur effect to the target region. FIG. 18 illustrates an image, on which the image processing has been performed, according to another embodiment. As another example, as illustrated in FIG. 18, the controller 102 of the second terminal 150 may apply a mosaic effect to the target region. FIG. 19 illustrates an image, on which the image processing has been performed, according to another embodiment. As another example, as illustrated in FIG. 19, the controller 102 of the second terminal 150 may substitute the target region with another image.

As another example, the controller 102 of the second terminal 150 may adjust a color, a brightness, a contrast, or a saturation of the target region. Also, the controller 102 of the second terminal 150 may combine the image processings listed above. For example, the controller 102 of the second terminal 150 may apply the blur effect on the target region, reduce the saturation, and reduce the contrast.

Referring to FIG. 3 again, in operation S140, the plurality of images included in the stream may be displayed. The output interface 105 of the second terminal 150 may display the plurality of images. For example, the display included in the output interface 105 of the second terminal 150 may continuously display twenty images per second. The plurality of images may include one or more images on which the image processing has been performed by the controller 102 of the second terminal 150.

Therefore, the user of the second terminal 150, who makes a video call with the user of the first terminal 100, can be prevented from being exposed to obscene images from the counterpart. Also, the user of the second terminal 150 can be prevented from sexual shame or discomfort that he or she may feel from the image from the counterpart. Also, a proper video call between the user of the first terminal 100 and the user of the second terminal 150 may be guided.

In operation S150, a request for cancelling the image processing may be received. For example, the user of the second terminal 150 may want to view the original of the received image, while taking the exposure to inappropriate images lying down. The display included in the output interface 105 of the second terminal 150 may output a message asking whether to cancel the image processing. For example, the output interface 105 of the second terminal 150 may output a message "No face is detected. Please press the button to view the original." The user of the second terminal 150 may press the button included in the input interface 101 of the second terminal 150 as a response to the message. In other words, the input interface 101 of the second terminal 150 may receive the request for cancelling the image processing from the user of the second terminal 150.

In operation S160, the image received after the reception of the request among the plurality of images included in the stream may be displayed without image processing. The controller 102 of the second terminal 150 may determine that the face has not been detected in the image received after the reception of the request. In spite of the above determination, the controller 102 of the second terminal 150 may not perform image processing on the image received after the reception of the request. The controller 102 of the second terminal 150 may display one or more images received after the reception of the request without image processing.

Figure 20:
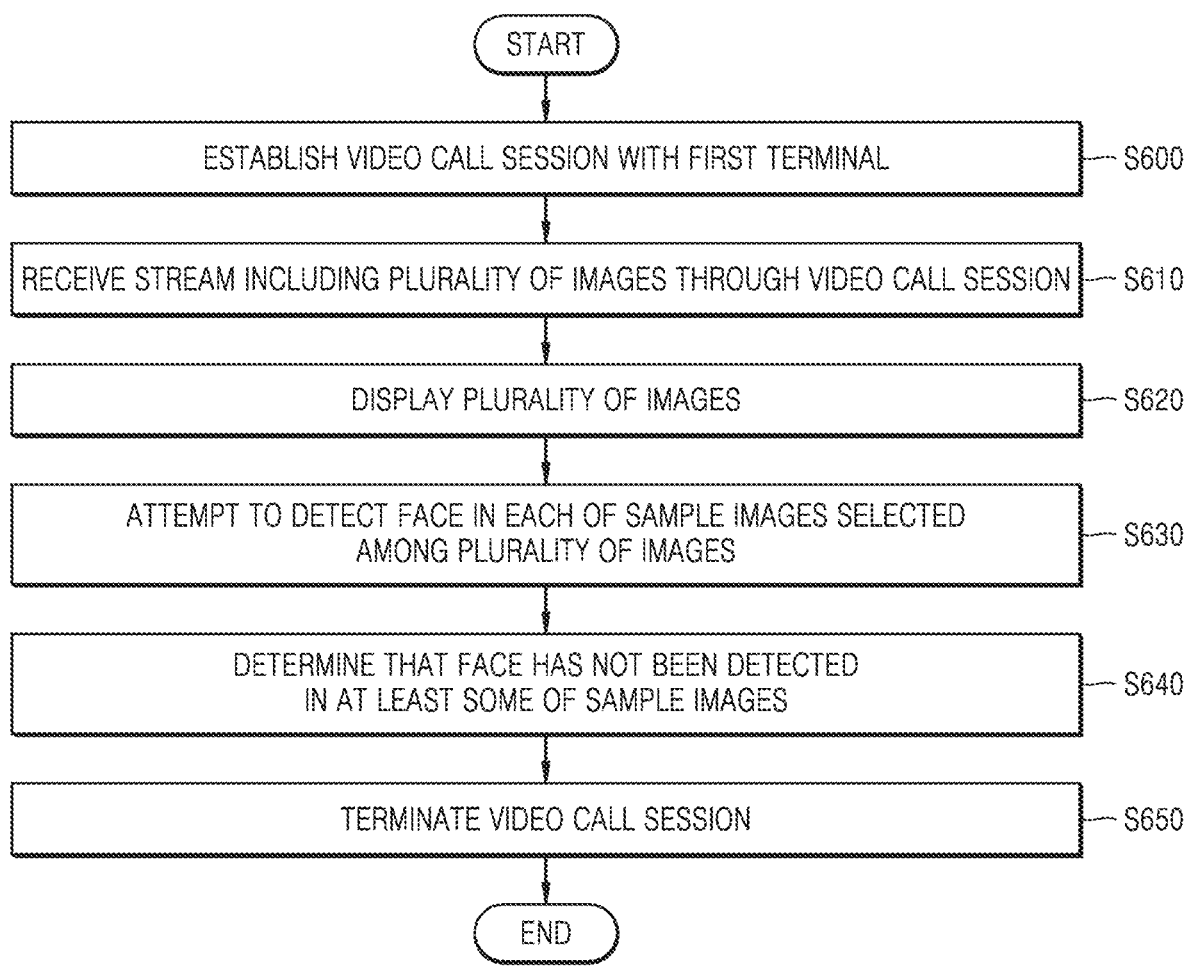
FIG. 20 is a flowchart of an image display method according to another embodiment.

FIG. 20 is a flowchart of an image display method according to another embodiment. Referring to FIG. 20, in operation S600, a video call session with the first terminal 100 may be established. The communication interface 104 of the second terminal 150 may establish the video call session with the first terminal 100.

In operation S610, a stream including a plurality of images captured by the first terminal 100 may be received through the video call session. The communication interface 104 of the second terminal 150 may receive the stream from the first terminal 100 through the video call session. The stream may include a plurality of images.

In operation S620, the plurality of images included in the stream may be displayed. The output interface 105 of the second terminal 150 may display the plurality of received images.

In operation S630, face detection is attempted in each of one or more sample images selected among the plurality of images included in the stream. The controller 102 of the second terminal 150 may select at least one of the plurality of images. The controller 102 of the second terminal 150 may detect whether a portion corresponding to a face exists in each selected sample image.

In operation S640, it may be determined that the face has not been detected in at least some of the sample images. The controller 102 of the second terminal 150 may determine that the face has not been detected in one or more sample images. When the face has not be detected in the sample image, inappropriate images may be included in the plurality of images.

In operation S650, the video call session may be terminated. The communication interface 104 of the second terminal 150 may terminate the video call session with the first terminal 100. Therefore, the user of the second terminal 150, who makes a video call with the user of the first terminal 100, can be prevented from being exposed to inappropriate images from the counterpart.

Figure 21:
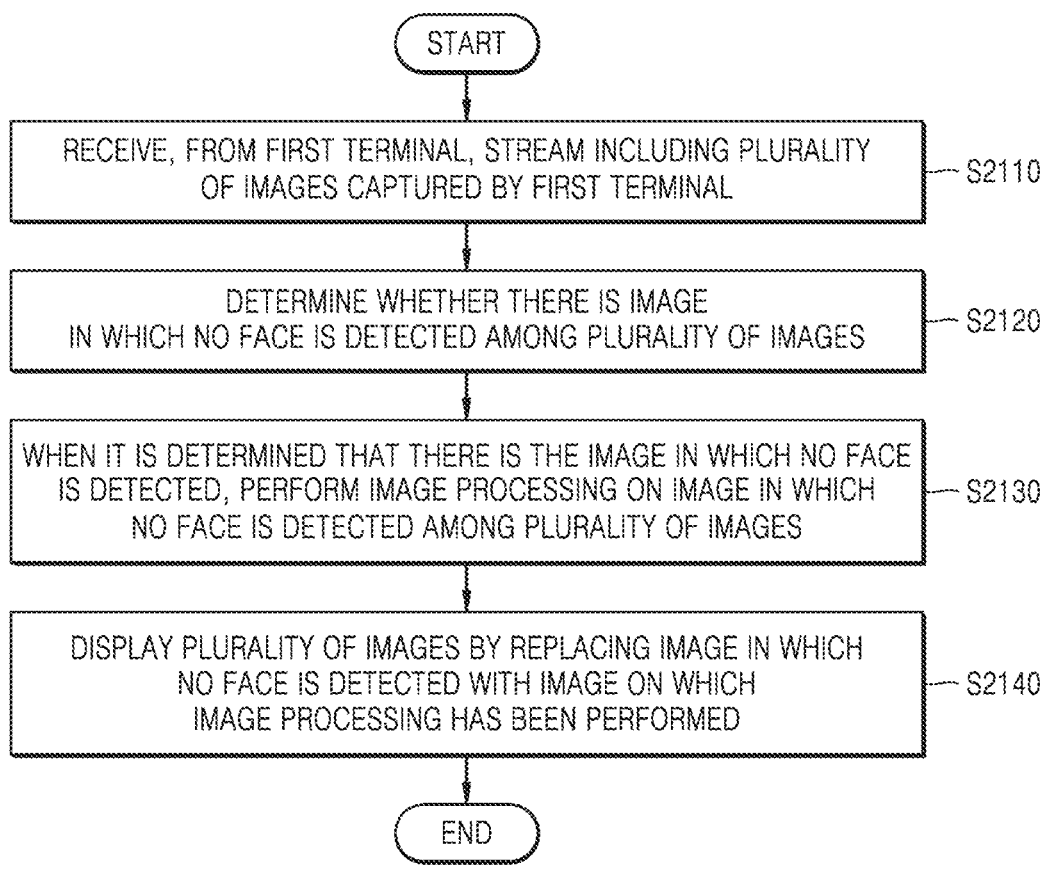
FIG. 21 is a flowchart of an image display method according to another embodiment.

FIG. 21 is a flowchart of an image display method according to another embodiment. Hereinafter, descriptions of parts that were previously described will be omitted.

The first terminal 100 and the second terminal 150 may establish a video call session and transmit and receive a stream including a plurality of images captured by each terminal. Hereinafter, referring to FIG. 21, a method of displaying an image performed by a terminal receiving a stream from a counterpart terminal will be described. For convenience of explanation, the description will be made on the assumption that the second terminal 150 receives a stream including an image in which no face is detected from the first terminal 100. However, the present disclosure is not limited to this embodiment, and the first terminal 100 may receive a stream including an image in which no face is detected from the second terminal 150. Furthermore, although the flowchart of FIG. 21 is described herein with reference to a particular order, in various embodiments, states or operations herein may be performed in a different order, or omitted, and additional states may be added.

In operation S2110, the second terminal 150 may receive a stream including a plurality of images captured by the first terminal 100 from the first terminal 100.

In operation S2120, the second terminal 150 may determine whether there is an image (or a first image) in which no face is detected among the plurality of images included in the stream.

According to an embodiment, the second terminal 150 may determine whether there is the image in which no face is detected, based on metadata information included in the stream. The stream received from the first terminal 100 may include metadata information together with the plurality of images captured by the first terminal 100. The metadata information includes information about images, and may include, for example, information about the image in which no face is detected, time stamp information corresponding to the image in which no face is detected, etc. Accordingly, the second terminal 150 may extract the metadata information from the stream received from the first terminal 100 and determine whether there is the image in which the face is not detected in the received stream through the metadata information. The metadata information may be included in a header file of the stream including the plurality of images.

According to another embodiment, the second terminal 150 may determine whether there is the image in which the face is not detected among the plurality of images using a learned face detection model. The face detection model is a type of data recognition model that detects whether a human face is included in an image and may be a learning model based on an artificial neural network.

In operation S2130, when it is determined that there is the image in which no face is detected, the second terminal 150 may perform image processing on the image in which no face is detected among the plurality of received images. The second terminal 150 may perform image processing to reduce visibility of the image in which no face is detected among the plurality of received images. The second terminal 150 may perform image processing in which a picture of the image in which no face is detected is blocked and a voice is maintained. Accordingly, a user of the second terminal 150 cannot see the picture of the image in which no face is detected, and can only hear the voice.

According to an embodiment, based on the time stamp information obtained from the metadata information, the second terminal 150 may select the image in which no face is detected from among the plurality of images included in the stream as a target image and perform the image processing on the target image. For example, the second terminal 150 may select all images corresponding to the time stamp information among the plurality of images included in the stream as the target image. The second terminal 150 may also select all images after a first image corresponding to the time stamp information among the plurality of images included in the stream as the target image. The second terminal 150 may further select all images corresponding to a time period from a first time point to a second time point of the time stamp information among the plurality of images included in the stream as the target image. However, the above selected target images are merely examples, and the target image is not limited thereto. The second terminal 150 may perform image processing on the entire region of the selected target image. For example, the second terminal 150 may delete the entire region of the target image, may apply a blur effect or a mosaic effect to the entire region of the target image, may adjust a color, a brightness, a contrast, or a saturation of the entire region of the target image, or may substitute the entire region of the target image with another image.

According to another embodiment, the second terminal 150 may select the image in which no face is detected as a target image based on a determination result using the learned face detection and perform image processing on the target image. For example, when a value of the determination result for each of the plurality of images included in the stream using the learned face detection model does not satisfy a predetermined condition, the second terminal 150 may select the image in which the value of the determination result does not satisfy the predetermined condition as the target image.

In operation S2140, the second terminal 150 may display a plurality of images by replacing the image in which no face is detected with an image (or a second image) on which the image processing has been performed. The second terminal 150 may display, in a first region on a screen of the second terminal 150 having a video call session established with the first terminal 100, the plurality of images including the image on which the image processing has been performed. The screen of the second terminal 150 may include the first region displaying an image of a user of the first terminal 100 and a second region displaying an image of a user of the second terminal 150.

Figure 22:
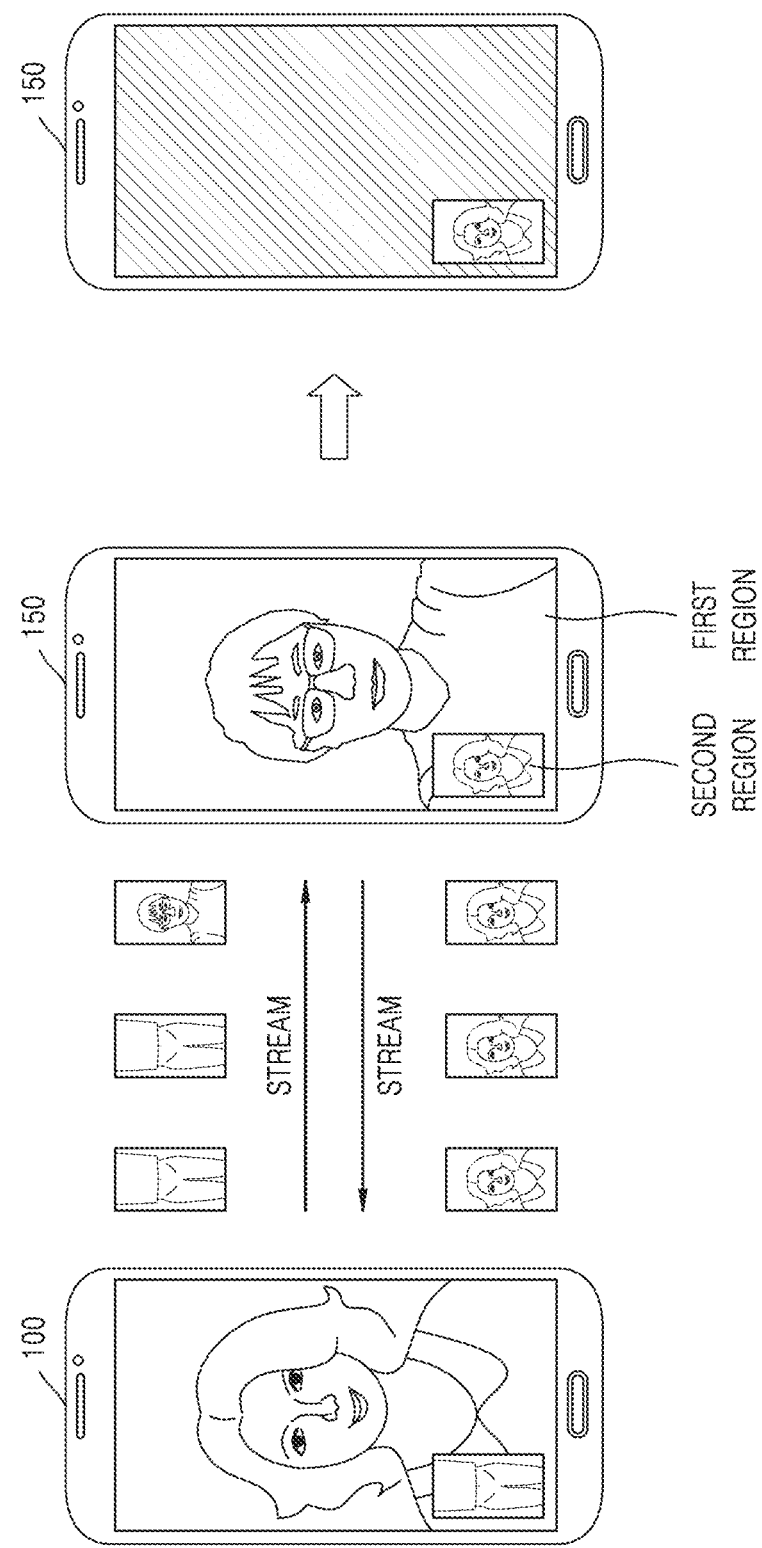
FIG. 22 is a diagram for explaining a state in which a second terminal displays a received image when a first terminal transmits a stream including an image in which no face is detected to a second terminal.

FIG. 22 is a diagram for explaining a state in which the second terminal 150 displays a received image when the first terminal 100 transmits a stream including an image in which no face is detected to the second terminal 150.

FIG. 22 shows an example of the display state illustrated assuming that, after a video call session between the first terminal 100 and the second terminal 150 is established, during transmission and reception of streams including images captured by each terminal, the user of the first terminal 100 transmits, to the second terminal 150, an image in which no face is detected, for example, an image in which the body excluding the face of the user of the first terminal 100 is exposed. Each of the first terminal 100 and the second terminal 150 may include a communication interface, a user interface, a memory storing instructions, and at least one processor.

When a video call session between the first terminal 100 and the second terminal 150 is established, the first terminal 100 may transmit a first stream including a first image captured by the first terminal 100 to the second terminal 150 and receive a second stream including a second image captured by the second terminal 150 from the second terminal 150. The second terminal 150 may transmit the second stream to the first terminal 100 and receive the first stream from the first terminal 100.

The processor (not shown) of the second terminal 150 may execute the instructions stored in the memory (not shown) to receive, through the communication interface unit (not shown), a stream including a plurality of images captured by the first terminal 100 from the first terminal 100.

The processor of the second terminal 150 may determine whether there is the image in which no face is detected among a plurality of images included in the stream.

According to an embodiment, the processor of the second terminal 150 may determine whether there is the image in which no face is detected among the plurality of images in the received stream, based on metadata information included in the stream. To this end, the first terminal 100 may check whether a face is detected in each image before transmitting the image captured by the first terminal 100 to the second terminal 150. The first terminal 100 may execute a face detection algorithm to determine whether a face is detected in each image captured by the first terminal 100 and, if a face is not detected, may include information about an image in which a face is not detected or time stamp information of the corresponding image, etc. in the stream in the form of metadata information to transmit it to the second terminal 150. The second terminal 150 may extract the metadata information from the stream received from the first terminal 100 and determine whether there is the image in which the face is not detected in the received stream through the metadata information.

According to another embodiment, the processor of the second terminal 150 may determine whether there is the image in which no face is detected among the plurality of images in the received stream using the learned face detection model.

When it is determined that there is the image in which no face is detected, the processor of the second terminal 150 may perform image processing on the image in which no face is detected among the plurality of images.

According to an embodiment, based on the time stamp information obtained from the metadata information, the processor of the second terminal 150 may select the image in which no face is detected from among the plurality of images included in the stream as a target image and perform the image processing on the target image. For example, when there are images in which no face is detected at each specific time point, the processor of the second terminal 150 may select all images corresponding to the time stamp information from among the plurality of images included in the stream as the target image. As another example, when images in which no face is detected continuously appear after a certain time point, the processor of the second terminal 150 may select all images after a first image corresponding to the time stamp information from among the plurality of images included in the stream as the target image. As another example, when an image in which no face is detected for a specific time period is displayed, the processor of the second terminal 150 may select all images corresponding to a time period from a first time point to a second time point of the time stamp information from among the plurality of images included in the stream as the target image.

According to another embodiment, the processor of the second terminal 150 may select the image in which no face is detected as the target image based on a determination result using the learned face detection model and perform image processing on the target image. For example, when a value of the determination result for each of the plurality of images included in the stream using the learned face detection model does not satisfy a predetermined condition, the processor of the second terminal 150 may select the image in which the value of the determination result does not satisfy the predetermined condition as the target image and perform image processing on the target image.

The processor of the second terminal 150 may perform image processing on the entire region of the target image. The processor of the second terminal 150 may perform image processing to reduce visibility of the image in which no face is detected. The processor of the second terminal 150 may perform image processing in which a picture of the image in which no face is detected is blocked and a voice is maintained.

The processor of the second terminal 150 may display a plurality of images through the user interface unit (not shown) by replacing the image in which no face is detected with an image on which the image processing has been performed. The screen of the user interface of the second terminal 150 may include a first region displaying an image of a user of the first terminal 100 and a second region displaying an image of a user of the second terminal 150. The processor of the second terminal 150 may display, in the first region, a plurality of images received from the first terminal 100 and including an image on which image processing has been performed, and may display, in the second region, an image captured by the second terminal 150.

Referring to FIG. 22, it can be seen that the second terminal 150 displays, in the first region, an image including a face of a user of the first terminal 100 and displays, in the second region, an image including a face of a user of the second terminal 150. After that, it can be seen that the second terminal 150 performs image processing on the entire region of an image in which the face of the user of the first terminal 100 is not detected so that the user of the second terminal 150 cannot see the image in which the face of the user of the first terminal 100, and then displays, in the first region, the image on which the image processing has been performed. In this case, it can be seen that the second terminal 150 continuously displays the image of the user of the second terminal 150 in the second region and the first terminal 100 may display the image in which no face is detected without separate image processing on the first terminal 100.

According to the embodiments set forth above, it is possible to prevent the user who makes the video call with the counterpart from being exposed to obscene images from the counterpart. Also, it is possible to prevent the user who makes the video call with the counterpart from sexual shame or discomfort that he or she may feel from the image from the counterpart. Also, it is possible to guide a proper video call between the users.

Embodiments may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a certain method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image display method comprising:
receiving, from a first terminal, a stream including a plurality of images captured by the first terminal;
determining, at a second terminal, whether the received stream includes a first image in which no face is detected among the plurality of images;
wherein determining is based on metadata information included in the stream;
in response to determining that the received stream includes the first image, selecting, as target images, all images corresponding to a time period from a time point corresponding to the first image to a second time point;
wherein selecting target images is based on time stamp information obtained from the metadata information;
performing, at the second terminal, image processing on the target images to generate a second image; and
displaying, at the second terminal, the plurality of images by replacing the target images with the second image.

2. The image display method of claim 1, wherein the image processing is performed to reduce visibility of the target images.

3. The image display method of claim 1, wherein image processing comprises blocking a picture of the target images and maintaining a voice relating to the target images.

4. The image display method of claim 1,
wherein the displaying comprises displaying, in a first region on a screen of the second terminal having a video call session established with the first terminal, the plurality of images including the second image, and
wherein the screen of the second terminal comprises the first region further displaying an image of a user of the first terminal and a second region displaying an image of a user of the second terminal.

5. The image display method of claim 1, wherein the selecting comprises selecting all images corresponding to the time stamp information from among the plurality of images included in the stream as the target images.

6. The image display method of claim 1, wherein the selecting comprises selecting all images after the first image as the target images.

7. The image display method of claim 1, wherein the image processing for target images is performed on an entire region of the target images.

8. The image display method of claim 1, wherein:
the determining is performed using a learned face detection model, and
selecting the target images is based on a determination result using the learned face detection model.

9. An image display device comprising:
a communication interface;
a user interface;
a memory storing instructions; and
a processor configured to communicate data with the communication interface, the user interface and the memory, the processor further configured to execute the instructions to:
receive, from a first terminal through the communication interface, a stream including a plurality of images captured by the first terminal;
determine whether the received stream includes a first image in which no face is detected among the plurality of images;
wherein determining is based on metadata information included in the stream;
in response to determining that the received stream includes the first image, selecting, as target images, all images corresponding to a time period from a time point corresponding to the first image to a second time point;
wherein selecting target images is based on time stamp information obtained from the metadata information;
perform image processing on the target images to generate a second image; and
display, through the user interface, the plurality of images by replacing the target images with the second image.

10. The image display device of claim 9, wherein the processor is configured to execute the instructions to perform image processing to reduce visibility of the target images.

11. The image display device of claim 9, wherein the processor is configured to execute the instructions to perform image processing to block a picture of the target images and maintain a voice relating to the target images.

12. The image display device of claim 9, wherein:
the user interface includes a first region configured to display an image of a user of the first terminal and a second region configured to display an image of a user of the image display device, and
the processor is configured to execute the instructions to display, in the first region, the plurality of images including the second image.

13. The image display device of claim 9, wherein the processor is configured to execute the instructions to select all images corresponding to the time stamp information from among the plurality of images included in the stream as the target images.

14. The image display device of claim 9, wherein the processor is configured to execute the instructions to select all images after the first image as the target images.

15. The image display device of claim 9, wherein the processor is configured to execute the instructions to perform image processing on entire regions of the target images.

16. The image display device of claim 9, wherein the processor is configured to execute the instructions to:
determine whether the received stream includes the first image using a learned face detection model;
select the target images based on a determination result using the learned face detection model; and
perform the image processing on the target images.

17. A non-transitory computer-readable recording medium having recorded thereon a program to execute an image display method, the method comprising:
receiving, from a first terminal, a stream including a plurality of images captured by the first terminal;

determining, at a second terminal, whether the received stream includes a first image in which no face is detected among the plurality of images;
  wherein determining is based on metadata information included in the stream;
in response to determining that the received stream includes the first image, selecting, as target images, all images corresponding to a time period from a time point corresponding to the first image to a second time point;
  wherein selecting target images is based on time stamp information obtained from the metadata information;
performing, at the second terminal, image processing on the target images to generate a second image; and
displaying, at the second terminal, the plurality of images by replacing the target images with the second image.

* * * * *